Patented Jan. 8, 1946

2,392,455

UNITED STATES PATENT OFFICE 2,392,455

INSECTICIDE

Charles Verne Bowen, Bethesda, Md., and Lloyd E. Smith, Washington, D. C., assignors to Claude R. Wickard, as Secretary of Agriculture of the United States of America, and his successors in office No Drawing. Application June 9, 1941,
Serial No. 397,218

5 Claims. (Cl. 167—32)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This is a continuation in part of our application for patent, Serial No. 253,142, filed January 27, 1939.

Our invention relates to improvements in materials for destroying or checking the growth or multiplication of living organisms, whether plant or animal, which are economically injurious to man.

An object of this invention is to provide a material suitable for use as an insecticide.

Another object of this invention is to provide a material which is relatively non-toxic to man and warm-blooded animals when taken by mouth, and which can be used in place of lead arsenate and other arsenicals for destroying insects, without leaving a harmful residue on fruits and vegetables.

We have found that 3-nitroacenaphthene and dinitroacenaphthene are effective in killing many species of living organisms whether plant or animal when applied either externally or internally; that these organic compounds may be sprayed or dusted upon delicate foliage without injuring it; that these materials are even more effective than lead arsenate and other commonly used insecticides; and that they are relatively non-toxic to warm-blooded animals.

Under actual tests against newly hatched codling moth larvae, as a spray at a concentration of 2 pounds per 100 gallons, 3-nitroacenaphthene gave a control of 25 percent greater than lead arsenate when used at the same concentration.

Dinitroacenaphthene was also found to be satisfactory as an insecticide under actual tests.

Both dinitroacenaphthene and 3-nitroacenaphthene may be reduced to impalpable powder by grinding and applied to vegetation either dry as a dust or wet as a spray. The products being soluble in oils may be applied as a component of an oil emulsion spray. When applied as a spray in water, it may be desirable to incorporate an effective wetting agent, such as one of the so-called sulfonated oils. For certain purposes, the addition of a suitable adhesive or "sticker" may be advisable. These products may be applied by dissolving them in an appropriate solvent, such as acetone, and pouring the resulting solution into water, whereupon a fine colloidal precipitate is formed. This may be applied directly to the host plant, or may be combined with a suitable wetting agent, or adhesive, and then sprayed. For the control of certain types of insects it may be advantageous to admix any one of this class of compounds with known insecticides such as for example pyrethrum, derris, the arsenicals, phenothiazine, and so forth.

Having thus described our invention, we claim:

1. An insecticide containing as its essential active ingredient 3-nitroacenaphthene.

2. An insecticidal composition of matter comprising 3-nitroacenaphthene and a carrier therefor.

3. An insecticidal spray composition comprising 3-nitroacenaphthene suspended in a compatible liquid containing spreading and sticker conditioners.

4. An insecticidal composition of matter comprising 3-nitroacenaphthene and a solvent carrier therefor.

5. The method of controlling insects comprising applying 3-nitroacenaphthene in finely divided form to the habitat of insects.

CHARLES VERNE BOWEN.
LLOYD E. SMITH.